United States Patent
Foo et al.

(10) Patent No.: US 9,275,492 B2
(45) Date of Patent: Mar. 1, 2016

(54) METHOD AND SYSTEM FOR MULTISAMPLE ANTIALIASING

(71) Applicant: Imagination Technologies Limited, Kings Langley (GB)

(72) Inventors: Yoong Chert Foo, London (GB); Salil Sahasrabudhe, Kings Langley (GB); Andrew Davy, Kings Langley (GB)

(73) Assignee: Imagination Technologies Limited, Kings Langley (GB)

( * ) Notice: Subject to any disclaimer, the term of this patent is extended or adjusted under 35 U.S.C. 154(b) by 343 days.

(21) Appl. No.: 13/671,087

(22) Filed: Nov. 7, 2012

(65) Prior Publication Data

US 2013/0187917 A1 Jul. 25, 2013

(30) Foreign Application Priority Data

Nov. 8, 2011 (GB) .................................. 1119322.4

(51) Int. Cl.
*G06T 1/60* (2006.01)
*G06T 15/00* (2011.01)
*G06T 15/50* (2011.01)

(52) U.S. Cl.
CPC .................. *G06T 15/005* (2013.01); *G06T 1/60* (2013.01); *G06T 15/503* (2013.01)

(58) Field of Classification Search
CPC .................................................... G06T 2200/12
See application file for complete search history.

(56) References Cited

U.S. PATENT DOCUMENTS

| 5,684,939 A * | 11/1997 | Foran ................... G06T 11/001 345/612 |
| 7,629,982 B1 | 12/2009 | King et al. |
| 2003/0189575 A1 | 10/2003 | Coleman et al. |
| 2004/0161146 A1 | 8/2004 | Van Hook et al. |
| 2007/0257935 A1 * | 11/2007 | Koduri ...................... G06F 3/14 345/611 |
| 2009/0073168 A1 * | 3/2009 | Jiao et al. ...................... 345/426 |
| 2009/0256848 A1 * | 10/2009 | Iourcha et al. ................ 345/522 |

OTHER PUBLICATIONS

GB1119322.4 Combined Examination & Search Report Mar. 13, 2012.

\* cited by examiner

*Primary Examiner* — Kee M Tung
*Assistant Examiner* — Ryan D McCulley
(74) *Attorney, Agent, or Firm* — Vorys, Sater, Seymour and Pease LLP; Vincent M DeLuca

(57) ABSTRACT

A method and system for generating two or three dimensional computer graphics images using multisample antialiasing (MSAA) is provided, which enables memory bandwidth to be conserved. For each of one or more pixels it is determined whether all of a plurality of sample areas of that pixel are located within a particular primitive. For those pixels where it is determined that all the sample areas of that pixel are located within that primitive, a value is stored in a multisample memory for a smaller number of the sample areas of that pixel than the total number of the sample areas of that pixel and data is stored indicating that all the sample areas of that pixel are located within that primitive.

18 Claims, 4 Drawing Sheets

METHOD AND SYSTEM FOR MULTISAMPLE ANTIALIASING

BACKGROUND

1. Field

The following relates to a method and system for generating two or three dimensional computer graphics images and more specifically to a method and system for implementing multisample antialiasing (MSAA) when generating such images.

2. Related Art

Antialiasing is a well-known technique for minimising the appearance of jagged edges which result when objects with curved or diagonal lines are displayed on a computer screen. In computer graphics, objects are represented by a plurality of primitives, which are commonly triangular but may be other shapes. A computer screen is physically comprised of many picture elements known as pixels which are usually rectangular and of a certain size. For example, high resolution displays contain an array of at least 1280×1024 pixels. Each pixel is driven to display a certain colour and the computer system generates a colour value to drive each individual pixel. Colours emanating therefrom form an image. Thus, it will be appreciated that where an object has a curved or diagonal line a pixel may belong to more than one object or primitive from which the objects are composed. In other words, the pixel may be split between two or more primitives, or between one or more primitives and the background, by a line passing through the pixel. However, the pixel can only display a single colour at a time. This means that the pixel must be assigned the colour of only one of the primitives which is inaccurate and results in unwanted visual artefacts such as jagged edges which impair the quality of the images.

Antialiasing is based on the principle that the appearance of such visual artefacts may be reduced if the pixels on the edge of a primitive or object are assigned a colour derived from all the primitives/background to which they belong. The jagged edge still exists but the appearance of the jagged edge to a viewer is not as apparent because colour contributions from both objects are used.

One well known antialiasing technique is MultiSample AntiAliasing (MSAA). Instead of assigning pixel characteristics according to the intersection of the centerpoint of the pixel with an object, multiple points dispersed throughout the pixel are used to sample the pixel/object intersection at those particular locations. A pixel is typically divided into two, four or eight sample areas, as illustrated in FIG. 1a. It is then determined whether each of the sample areas falls within a particular primitive or outside it. This is done, for example, by determining whether the centerpoint of each sample area intersects a primitive/object. Those sample areas whose centerpoints are determined to fall within a primitive, are assigned the colour of that primitive for that pixel. Those samples areas which are determined to be outside the primitive or which intersect a different primitive, retain their previous colour or that of the different primitive. An example where a pixel is on the edge of a primitive, a triangle in this example, is illustrated in FIG. 1b. In this example, the pixel is divided into four sample areas and sample areas 2 and 3 are within the triangle and therefore assigned the colour of the triangle for that pixel. Sample areas 0 and 1 are outside the triangle and therefore retain their previous colour. Before rendering, final pixel values are generated based on an average of the colour values assigned to each pixel's sample areas.

Advantageously, this means that edges of objects having curved or diagonal lines appear smoothed when the image is rendered.

However, a downside to multisample antialiasing is that pixel values must be stored in a multisample memory for all of the sample areas of all the pixels in an image. The more sample areas into which each pixel is divided, the better the antialiasing results; the smoother the lines appear, but the larger the multisample memory required to store all the sampled pixel values and, moreover, the greater the memory bandwidth consumed to read and write the pixel sample data therefrom.

For each pixel sample area, a value is written to the multisample memory. This means that there is at least two times and often eight times the amount of data to be written to memory, in comparison to using a single sample per pixel.

Furthermore, in rasterization approaches to 3-D rendering, images are rendered from 3-D scenes that may sequentially process primitives in a stream of primitives, some of which may be occluded by later-arriving primitives. Where the closest primitives (visible surfaces) hide other primitives, and the closest primitives are not transparent, it is only the closest primitives which are rendered and are visible to a viewer. In systems using multisample antialiasing, typically, pixel sample values for each pixel at least partially within a primitive are written to the multisample memory. If and when a primitive closer to the viewer overlaps these pixels, then pixel sample values for each of these pixels are overwritten in the multisample memory. Thus, when using multisample antialiasing to generate images from 3-D scenes, particularly complex 3D scenes, in which a great deal of occlusion may be expected, several pixel sample values for each pixel may need to be written to the multisample memory. This increases the demand on memory bandwidth.

SUMMARY

Implementations reduce the amount of memory bandwidth required for multisample antialiasing. A first aspect provides a method for generating two or three dimensional computer graphics images using multisample antialiasing, comprising: dividing each of one or more pixels into a plurality of sample areas; and determining, for each of the one or more pixels, whether all the sample areas of that pixel are located within a particular primitive; for pixels where it is determined that all the sample areas of that pixel are located within that primitive, the method further comprising: storing a value in a multisample memory for a smaller number of the sample areas of that pixel than the total number of the sample areas of that pixel; and storing data indicating that all the sample areas of that pixel are located within that primitive.

The applicant has appreciated that, where a pixel is wholly within a particular primitive or "off-edge", which is the case where all of the sample areas of that pixel are determined to be located within that primitive, the value assigned to each sample area will be the same. An exception, as the skilled person will appreciate from the disclosure, is where, for that primitive, that pixel is transparent. In that case, although all the sample areas of that pixel may be located within that primitive, the values assigned to each sample area may nonetheless be different in order to store pixel values for that primitive as well any underlying primitives which will be viewable through that primitive. In this case, the final pixel value will be a combination of the pixel value for the transparent primitive and those viewable therethrough.

Thus, the applicant has appreciated that, in general, without losing accuracy, where a pixel is "off edge", a value does not need to be stored in the multisample memory in respect of each sample area of that pixel, provided an indication is stored that all the sample areas of that pixel are located within that primitive. According to the first aspect, a value is stored in the multisample memory for a smaller number of the sample areas of that pixel than the total number of sample areas of that pixel. Preferably, that smaller number is one. Advantageously, this means that fewer values need be written to the multisample memory in comparison to known systems, and therefore memory bandwidth can be conserved. Each value may comprise a colour value, which typically contain several bits, and therefore it will be appreciated that this saving may be substantial.

The stored data indicating that all the sample areas of that pixel are located within that primitive may be used when generating final pixel values for rendering and/or when sequentially processing a plurality of primitives, furthest from to closest to a viewer, and a pixel which is wholly within one primitive is subsequently on the edge of a second primitive, as explained below.

Preferably, the stored indication comprises a flag, which may comprise a single bit.

The method may also comprise determining whether each of the one or more pixels is transparent for a particular primitive; and for those pixels which are transparent for that primitive, storing a value in the multisample memory for each of the sample areas of that pixel.

In addition, the method may also comprise: determining, for each of the one or more pixels, whether only some of the sample areas of that pixel are located within a particular primitive; and for pixels where it is determined that only some of the sample areas of that pixel are located within that primitive, the method further comprising: storing a value in the multisample memory for each of the sample areas of that pixel located within the particular primitive; and storing data indicating that only some of the sample areas of that pixel are located within that primitive.

The applicant has appreciated that the same principal may be applied after the values have been stored in the multisample memory, to reduce the memory bandwidth consumed when reading the values from the multisample memory to generate the final pixel values for rendering.

A second aspect provides a method for generating two or three dimensional computer graphics images using multisample antialiasing, comprising: dividing each of one or more pixels into a plurality of sample areas; determining, for each of the one or more pixels, whether all the sample areas of that pixel are located within a particular primitive; for pixels where it is determined that all the sample areas of that pixel are located within that primitive, the method further comprising: storing a value in a multisample memory for each of one or more of the sample areas of that pixel; and storing data indicating that all the sample areas of that pixel are located within that primitive; the method subsequently comprising: for each of the one or more pixels, reading the stored data to determine whether all the sample areas of that pixel are presently located within a particular primitive; for pixels where it is determined that all of the sample areas of that pixel are presently located within a particular primitive, the method further comprising: passing the stored value for a smaller number of the sample areas of that pixel than the total number of the sample areas of that pixel to a processor for generating final pixel values for rendering.

Thus, regardless of whether memory bandwidth has been conserved by writing fewer values to the multisample memory than the total number of sample areas when processing the primitive, the applicant has appreciated that memory bandwidth can be conserved, where it is determined that a pixel is "off edge", by reading fewer values from the multisample memory for that pixel than the total number of sample areas for that pixel when generating the final pixel value for that pixel. According to the second aspect, a value is passed from the multisample memory to a processor for generating final pixel values for a smaller number of the sample areas of that pixel than the total number of sample areas of that pixel. Preferably, that smaller number is one. Thus, similarly to the first aspect, this means that, advantageously, fewer values need be read from the multisample memory in comparison to known systems, and therefore memory bandwidth can be conserved. It can be determined whether all the sample areas of a particular pixel are presently located within a particular primitive, since an indication to that effect is stored, which can subsequently be read, when that primitive is processed.

Preferably, the method further comprises outputting the stored value for one of the sample areas of that pixel as the final pixel value for that pixel. Since all of the sample areas of a pixel are typically the same where a pixel is "off edge", the applicant has appreciated that the calculation or averaging step performed to produce the final pixel values for those pixels can be omitted, since in this case the average of the sample area values for each pixel will be the same as the value of one of the sample areas. Advantageously, this means that processing power, as well as memory bandwidth, can be conserved.

In an embodiment in which a plurality of primitives for each of the one or more pixels are processed sequentially, the method further comprises, for each pixel: reading the stored data for that pixel to determine whether all the sample areas of that pixel are located within a previously processed primitive; and determining whether all, or only some, of the sample areas of that pixel are located within a primitive being subsequently processed; for pixels where the stored data indicates that all the sample areas of that pixel are located within the previously processed primitive, and where it is determined that only some of the sample areas of that pixel are located within the primitive being subsequently processed, the method further comprising: copying the stored value in the multisample memory for the previously processed primitive for any sample areas of that pixel which are not located within the primitive being subsequently processed and for which the stored value for the previously processed primitive is not already stored; and storing a value for the subsequently processed primitive in the multisample memory for each of the sample areas of that pixel which are located within the subsequently processed primitive.

Preferably, for pixels where it is determined that all the sample areas of that pixel are located within a previously processed primitive, and where it is determined that only some of the sample areas of that pixel are located within the primitive being subsequently processed, the method further comprises updating the stored data to indicate that only some of the sample areas of that pixel are located within that subsequently processed primitive.

BRIEF DESCRIPTION OF THE DRAWINGS

An example implementation will now be described, with reference to the accompanying drawings, in which.

DETAILED DESCRIPTION

Figure 2:
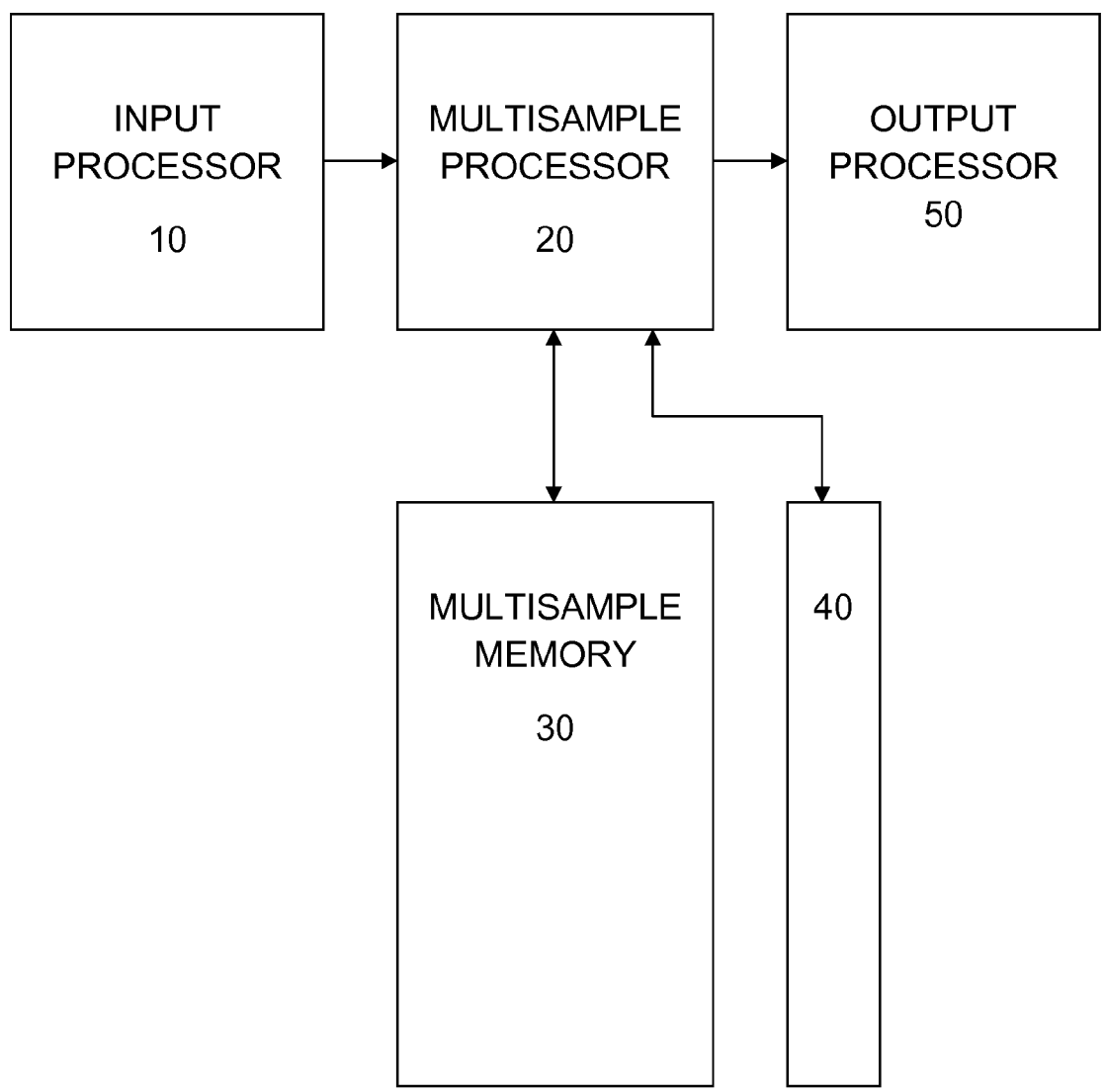
FIG. 2 is a block diagram showing an overview of a computer graphics system in which embodiments may be implemented.

FIG. 2 shows a schematic overview of an example computer graphics system implementing aspects of the disclosure. The system comprises an input processor 10 coupled to a multisample processor 20. The input processor 10 communicates pixel data generated for each of the primitives in an image to the multisample processor 20. The primitives may be triangles, but may also be other shapes including circles. The pixel data for a primitive comprises a pixel value for each pixel overlapped by the primitive.

Figure 1A:
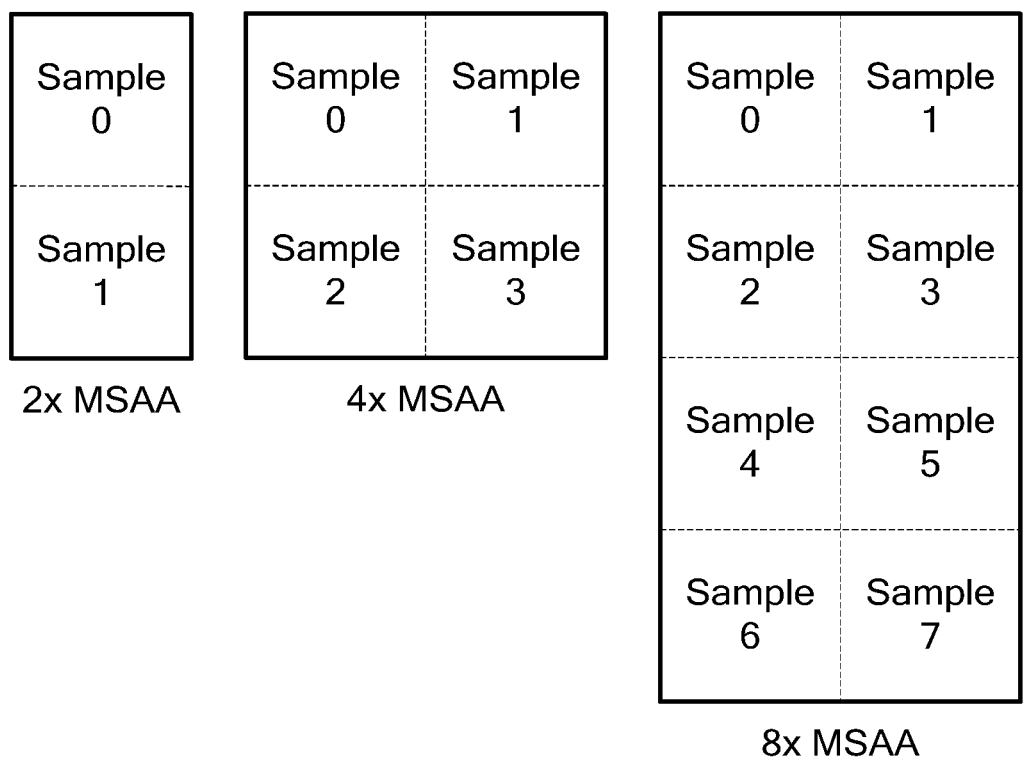
FIG. 1a illustrates schematically, but not to scale, a pixel divided into two, four and eight sample areas.
Figure 1B:
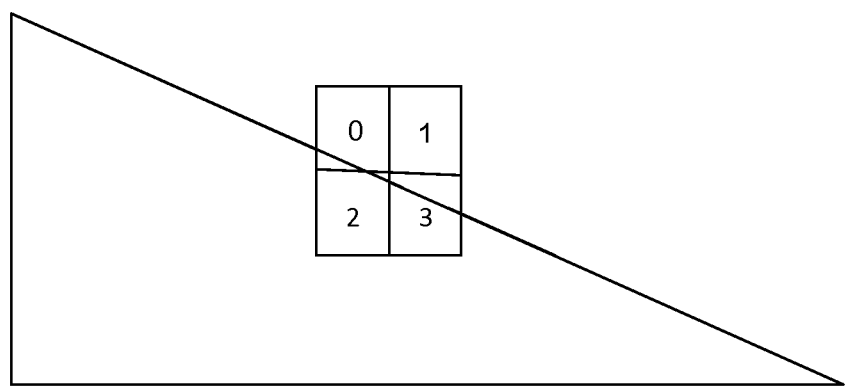
FIG. 1b illustrates an example where a pixel divided into four sample areas is located on an edge of a triangle.

In this example, each pixel in the image is divided or subdivided into four, equal, square sample areas, as illustrated in FIG. 1a. However, it will be appreciated that each pixel may be divided into a different number of sample areas and the sample areas may have a different shape. For each primitive, the pixel data also comprises data, for each pixel in the image, indicating whether each of that pixel's sample areas is within or outside that primitive. This data may comprise a single bit per sample area, for example a "1" if the sample area is determined to be within the primitive and a "0" if it is not, or vice versa. There are many known techniques for determining whether a pixel sample area is within or outside a primitive, which is commonly done with respect to a sample point within the sample area. This sample point may be the centerpoint of the sample area but may also be a different point within the sample area.

The pixel values for each primitive comprise a pixel value for each pixel having at least one sample area within the primitive. In this embodiment, the pixel values comprise colour information or values for the pixels. The pixel values may also comprise other values, for example values for the depth of the pixels. In this example, the pixel values comprise data for each of four colour components R, G, B and A, where A indicates the transparency of the pixel and is also known as the alpha or blending component. Each of the colour components is represented by either 16 bits or 32 bits. However, it will be appreciated that different colour components, and different numbers of bits, may be used. This pixel data, including the pixel value and sample area location, is sometimes referred to as a sample mask.

The input processor 10 communicates the pixel data for each primitive in the image to the multisample processor 20 sequentially, starting from those primitives furthest from the viewer, followed successively by those primitives closer to the viewer.

The multisample processor 20 communicates with a multisample memory 30 for temporarily storing pixel values for each pixel in the image, and with a region of memory 40 for storing data or meta data, for each pixel, indicating whether all the sample areas, or only some of the sample areas, of that pixel fall within a particular primitive. That is, whether each pixel is presently wholly within a primitive (the most recently processed primitive or a previously processed primitive, where the most recently processed primitive did not overlap that pixel) or on the edge of a primitive (overlapping one or a plurality of primitives). This meta data may be stored in a buffer and may comprise a flag or edge flag. The flag may comprise a single bit per pixel, for example, a "0" may indicate that a pixel is presently wholly within a primitive, and a "1" may indicate that a pixel is presently on the edge of a primitive, or vice versa.

It is preferred to allocate a portion of memory in the multisample memory for each sample area of each pixel in the image or at least a region of the image, since, as explained above, primitives from which an image is composed are typically processed sequentially, from those furthest from to closest to the viewer, as in this embodiment. Therefore, even if the values of all of a pixel's sample areas are the same in the first instance, and therefore sampled pixel values do not need to be written to the multisample memory in respect of each sample area, this may not be so once a subsequent primitive is processed. Allocating a portion of memory for each sample area avoids the overhead of having to dynamically allocate memory, when a pixel is subsequently on the edge of a primitive.

The multisample processor 20 is also coupled to an output processor 50. Before rendering, the multisample processor 20 reads the current values of the sample areas for each pixel and the output processor 50 determines a final pixel value for each pixel based on an average weight or other means of combining the sample values. These final pixel values may be stored in a separate memory, for example a frame buffer. These final values may then be read by a display subsystem to display the image on one or more display monitors. These computer graphics images may be rendered in two or three dimensions.

Figure 3:
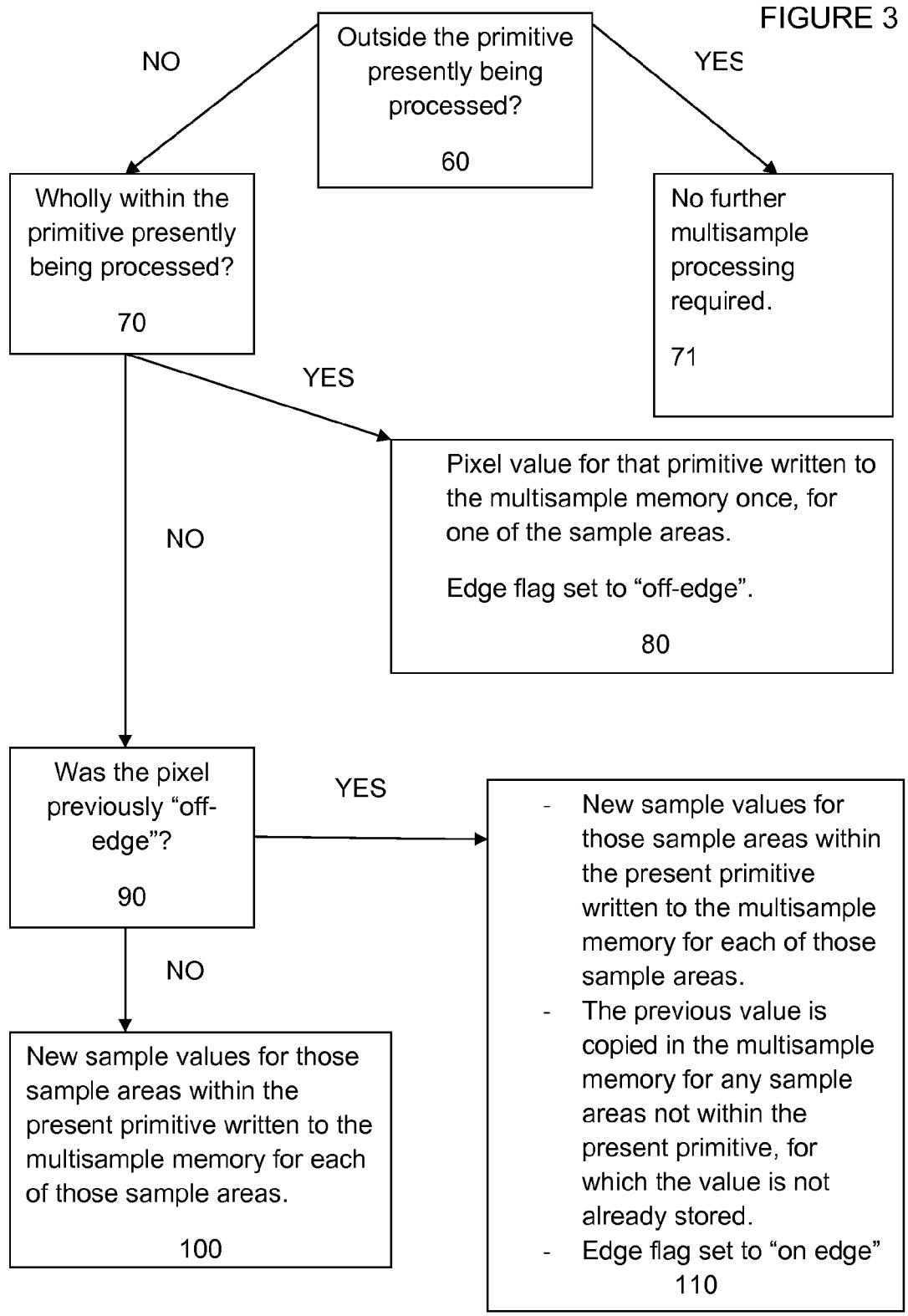
FIG. 3 is an example flow chart detailing a process embodiment.

FIG. 3 is a flow chart illustrating an process according to the disclosure. Instead of always storing a value for each sample area of a pixel in the multisample memory, the applicant has appreciated that memory bandwidth can be conserved if, where all of a pixel's sample areas are within a primitive, or in other words the pixel is not considered to be on the edge of a primitive, only one value is written to the multisample memory. Meta data, which may comprise a single bit as discussed above, is stored to indicate that that pixel is presently "off edge". This indication is particularly desirable since if the pixel is subsequently "on edge" of a subsequently processed primitive, the system may determine that the stored value may need to be copied for other ones of the pixel's sample areas. Where a pixel is on the edge of a primitive, values are stored for each sample area. This indication may also be used by the multisample processor/output processor when generating the final pixel values, as will be discussed in more detail below.

At step 60 a determination is made as to whether a pixel is outside a primitive presently being processed. This is done by determining from the sample mask for that pixel whether all of the pixel's sample areas are outside the primitive (in that case, in this example, they will all have a "0"). If a pixel is outside a primitive no further multisample processing is required (stopping at 71), since the pixel sample area values will not have changed.

If a pixel is determined to be at least partially inside the primitive (that is, at least one of the pixel's sample areas is determined to be inside the primitive, and therefore, in this example, at least one of the sample areas in the sample mask has a "1"), it is then determined at step 70 whether that pixel is wholly within or only partially within the primitive (that is, whether all of that pixel's sample areas are within the primitive or only some of them are).

If the pixel is determined to be wholly within the primitive, then, at step 80 the pixel value for that primitive is written to the multisample memory only once, in respect of one of the sample areas, and the edge flag is set to "off-edge". Where that pixel sample area previously had a stored value, that value is overwritten with the new value. Preferably, the new value, where a pixel is "off-edge", is always written to a particular one of the sample areas for that pixel in the multisample memory, and most preferably the first listed sample area. Any values stored in the multisample memory for the other pixel sample areas may be deleted. However, this is not necessary, provided the multisample processor is configured to read only the current stored value when further processing that pixel. These two steps may be performed in any order.

Those skilled in the art will appreciate that an exception is where a pixel is determined to be wholly within the primitive, but for that primitive that pixel is transparent. In this case, the edge status of that pixel will depend on the underlying primitive for that pixel. As known in the art, typically, where a primitive is transparent, pixel values for the transparent primitive and the underlying primitive(s) which are viewable through the transparent primitive are stored in the multisample memory for that pixel. Thus, where a primitive is transparent, a value may therefore be written for each sample area in the multisample memory, whether that primitive is "on-edge" or "off-edge".

If the pixel is determined to be only partially inside the primitive, or in other words on the edge of the primitive, then it is first determined at step 90 whether the pixel was previously "on edge" or "off edge", and therefore whether the multisample memory includes present multisampled values for each of the pixel sample areas, or a present multisampled value for only one of them (in the case where the pixel was previously "off edge"). This can be done by reference to the edge flag for that pixel.

If it is determined that the pixel was previously "on edge", then generally the new sample values, for those sample areas now within the new primitive (indicated with by a "1" in the sample mask determined for the new primitive) are simply written at step 100 to the multisample memory for those sample areas. There is no need to update the edge flag for that pixel, since there is no change in the "on-edge"/"off-edge" status of the pixel.

If it is determined that the pixel was previously "off edge", then generally, as well as writing the new values for those sample areas now within the new primitive, the previous value, stored for only one of the sample areas, must be copied, for each of the other sample areas which are outside the new primitive. The exception is if the only sample area now not within the new primitive is the sample area to which the previous value were written. To copy the sample value, at step 110, the multisample processor first reads the existing value from the multisample memory and then writes it to the multisample memory for the other sample area(s) which do not have new values. Those sample areas which are outside the new primitive can be determined based on the indication stored in the sample mask. The multisample processor also writes the new values, for the sample areas determined to be within the new primitive, to the multisample memory. The edge flag for that pixel is then updated to indicate that the pixel is now "on edge", although, it will be appreciated that these three steps may be performed in any order.

These steps are repeated for each primitive from which the image is composed. The final pixel values are then generated from the sample values stored in the multisample memory after the values are updated for the last primitive processed in the image. These final pixel values are then rendered to display the image.

The multisample processor reads the sample values stored in the multisample memory and passes them to the output processor which calculates the final pixel values. In this embodiment, where a pixel is "off edge", which the multisample processor can determine by reading the edge flag for that pixel, the multisample processor only reads a value from the multisample memory once, the current value, and passes that to the output processor. Advantageously, therefore, where a pixel is "off edge", according to some embodiments, the number of reads as well as the number of writes required to implement multisample antialiasing can be reduced. Furthermore, the applicant has appreciated that, where a pixel is "off edge", the calculation or averaging step performed by the output processor to produce the final pixel values can be omitted, since in this case all of the sample values for that pixel are the same and therefore the average of the sample area values for that pixel is the same as the value of one of the sample areas. This means that processing power, as well as memory bandwidth, can be conserved. However, it will be appreciated that the final pixel values may be determined by a different method, based on those pixel values which are stored in the multisample memory in dependence with the indication or flags for each pixel indicating whether each pixel is wholly within or on the edge of a primitive.

Where during processing of the primitives of an image a pixel moves from "off edge" to "on edge", sample values may need to be read from and written to the multisample memory as explained above in order to complete the sample values for that pixel. However, the applicant has appreciated that, particularly where a large number of sample areas are used, which may be eight or more, reading and writing the sample values to those pixels which remain on the previous primitive may require less bandwidth than if the previous sample value had been written to all of the sample areas stored for that pixel. Furthermore, it will be appreciated that, in the majority of cases, the area of the primitives is sufficiently large that a pixel previously "off edge" will also be "off edge" of a subsequently processed primitive. Where this is the case, one has saved the bandwidth which would have been required to write the sample values for each, not one, of the sample areas in the multisample memory. It will be appreciated that, particularly where a large number of sample areas are used, this saving can be significant.

Although in the above described embodiment, where a pixel is determined to be wholly within a primitive or "off edge", the pixel value for that primitive is only written to the multisample memory once, for one of the pixel's sample areas. It will be appreciated that advantages may also be obtained, particularly where a pixel is divided into a large number of sample areas, if where a pixel is determined to be wholly within a primitive, the pixel value is written to the multisample memory for more than one of the pixel's sample areas, but less than the total number of the pixel's sample areas.

Furthermore, it will be appreciated that, although in the above described embodiment, memory bandwidth may be conserved, where a pixel is "off edge", by writing to and reading from the multisample memory a smaller number of values than the total number of sample areas of that pixel, in an alternative embodiment memory bandwidth may be conserved at only one of those stages. For example, even if values are written to the multisample memory for each sample area of a pixel, the applicant has appreciated that the stored indication enables fewer sample values to be read from the multisample memory when generating the final pixel values.

In the above, memory used in implementations according to the disclosure can comprise any of a variety of non-transitory data storage devices, ranging from dynamic Random Access Memory, Static RAM, flash, magnetic storage, optical storage and the like. Combinations of different memory technologies can be employed. Instructions for configuring any of the processors depicted in FIG. 2 also can be stored on and retrieved from such non-transitory media, in order to configure such processor(s) to practice aspects disclosed herein.

The order of activities depicted in the diagrams is not by way of limitation that such activities must be, or are preferred to be performed in that order. Additionally, there may be situations where not all depicted activities are performed in every pixel processing operation.

As would be apparent from the disclosure, some of the components and functionality disclosed may be implemented in hardware, software, firmware, or any combination thereof. If implemented in firmware and/or software, the functions may be stored as one or more instructions or code on a computer-readable medium, in one example, the media is non-transitory. Examples include a computer-readable medium encoded with a data structure and a computer-readable medium encoded with a computer program. Machine-readable media includes non-transitory machine readable media. Other kinds of media include transmission media. A non-transitory medium may be any tangible medium that can be accessed by a machine. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a machine.

Those of skill will also appreciate that the various illustrative logical blocks, modules, circuits, and algorithm steps described in connection with the embodiments disclosed herein may be implemented as electronic hardware, computer software in a computer-readable medium, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The description of the aspects and features is provided to enable any person skilled in the art to make and use the systems, apparatuses and perform the methods disclosed. Various modifications will be readily apparent to those skilled in the art, and the principles described in this document may be applied to other aspects without departing from the spirit or scope of the disclosure. Thus, the description is not intended to limit the claims. Rather, the claims are to be accorded a scope consistent with the principles and novel features disclosed herein.

The drawings include relative arrangements of structure and ordering of process components, solely as an aid in understanding the description. These relative arrangements and numbering is not an implicit disclosure of any specific limitation on ordering or arrangement of elements and steps in the claims. Process limitations may be interchanged sequentially without departing from the scope of the disclosure, and means-plus-function clauses in the claims are intended to cover the structures described as performing the recited function that include not only structural equivalents, but also equivalent structures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than, additional to, or less than, those identified herein. Rather, the described features and steps are disclosed as examples of components of systems and methods within the scope of the appended claims.

The invention claimed is:

1. A method for generating three dimensional computer graphics images using multisample antialiasing by sequentially processing a plurality of primitives, comprising:
    dividing at least a first pixel into a plurality of sample areas;
    processing a first primitive, by
        determining that all the sample areas of the first pixel are located within said first primitive,
        storing a value for the first primitive in a multisample memory for a smaller number of the sample areas of the first pixel than the total number of the sample areas of the first pixel, and
        storing data indicating that all the sample areas of the first pixel are located within the first primitive;
    subsequently processing a second primitive, by
        reading the stored data for the first pixel to determine that all the sample areas of the first pixel are located within the first primitive,
        determining that only some of the sample areas of the first pixel are located within the second primitive,
        determining whether the value for the first primitive is already stored in the multisample memory for each sample area of the first pixel which is not located within the second primitive,
    if it is determined that the value for the first primitive is already stored in the multisample memory for each sample area of the first pixel which is not located within the second primitive, storing a value for the second primitive in the multisample memory for each sample area of the first pixel which is located within the second primitive without reading from the multisample memory the value for the first primitive; and
    if it is determined that the value for the first primitive is not already stored in the multisample memory for each sample area of the first pixel which is not located within the second primitive, reading from the multisample memory the value for the first primitive, writing to the multisample memory the value for the first primitive for each sample area of the first pixel which is not located within the second primitive for which the value for the first primitive is not already stored, and storing a value for the second primitive in the multisample memory for each sample area of the first pixel which is located within the second primitive.

2. A method according to claim 1, wherein the smaller number of the sample areas of that pixel is one.

3. A method according to claim 1, wherein the value for the first primitive and the value for the second primitive comprises a colour value.

4. A method according to claim 1, wherein the data indicating that all the sample areas of the first pixel are located within the first primitive comprises a flag.

5. A method according to claim 4, wherein the flag comprises a single bit.

6. A method according to claim 1, comprising:
determining that the first pixel is transparent for a third primitive; and
storing a value in the multisample memory for each of the sample areas of the first pixel.

7. A method according to claim 1, further comprising: updating the data indicating that all the sample areas of the first pixel are located within the first primitive to indicate that only some of the sample areas of the first pixel are located within the second primitive.

8. A method according to claim 7, further comprising generating a final pixel value for rendering for the first pixel based on the values for the sample areas of the first pixel stored in the multisample memory and in dependence on the updated data for the first pixel.

9. An apparatus for generating images from 3-D image data using multisample antialiasing in sequential processing of a plurality of primitives from the 3-D image data, comprising:
a non-transitory memory;
a processor unit coupled with the non-transitory memory and configured for processing a first primitive by
dividing a first pixel into a plurality of sample areas,
determining that all the sample areas of the first pixel are located within said first primitive,
storing a value for the first primitive for a smaller number of the sample areas of the first pixel than the total number of the sample areas of the first pixel, and
storing data indicating that all the sample areas of the first pixel are located within the first primitive;
said processor unit being further configured for subsequently processing a second primitive by
reading the stored data for the first pixel to determine that all the sample areas of the first pixel are located within the first primitive,
determining that only some of the sample areas of the first pixel are located within the second primitive,
determining whether the value for the first primitive is already stored in the multisample memory for each sample area of the first pixel which is not located within the second primitive;
in response to determining that the value for the first primitive is already stored in the multisample memory for each sample area of the first pixel which is not located within the second primitive, storing a value for the second primitive for each sample area of the first pixel which is located within the second primitive without reading the value for the first primitive from the multisample memory; and
in response to determining that the value for the first primitive is not already stored in the multisample memory for each sample area of the first pixel which is not located within the second primitive, reading the value for the first primitive from the multisample memory, writing the value for the first primitive to the multisample memory for each sample area of the first pixel not located within the second primitive for which the value for the first primitive is not already stored and storing a value for the second primitive for each sample area of the first pixel which is located within the second primitive.

10. The apparatus according to claim 9, wherein the processor unit comprises one or more programmable processors.

11. The apparatus according to claim 9, wherein the processor unit comprises an input processor, an output processor and a multisample processor.

12. The apparatus according to claim 9, wherein the smaller number of the sample areas of the first pixel is one.

13. The apparatus according to claim 9, wherein the value for the first primitive and the value for the second primitive comprises a colour value.

14. The apparatus according to claim 9, wherein the data indicating that all the sample areas of the first pixel are located within the first primitive comprises a flag.

15. The apparatus according to claim 14, wherein the flag comprises a single bit.

16. The apparatus according to claim 9, wherein the processor unit is further configured for
determining that the first pixel is transparent for a third primitive; and
for storing a value in the multisample memory for each of the sample areas of the first pixel.

17. The apparatus according to claim 9, wherein the processor unit is further configured for updating the data indicating that all the sample areas of the first pixel are located within the first primitive to indicate that only some of the sample areas of the first pixel are located within the second primitive.

18. The apparatus according to claim 17, wherein the processor unit is further configured for generating a final pixel value for rendering for the first pixel based on the values for the sample areas of the first pixel stored in the multisample memory and in dependence on the updated data for the first pixel.

* * * * *